United States Patent
Muramatsu et al.

[19]

[11] Patent Number: 5,860,405
[45] Date of Patent: Jan. 19, 1999

[54] INTAKE APPARATUS OF INTERNAL COMBUSTION ENGINE

[75] Inventors: Tatsuhiro Muramatsu; Tetsuo Nojima; Yuji Sonoda, all of Hamamatsu, Japan

[73] Assignee: Suzuki Kabushiki Kaisha, Japan

[21] Appl. No.: 806,721

[22] Filed: Feb. 27, 1997

[30] Foreign Application Priority Data

Feb. 28, 1996 [JP] Japan .................................. 8-041009

[51] Int. Cl.⁶ ...................................................... F02P 5/14
[52] U.S. Cl. ...................................................... 123/406.51
[58] Field of Search ..................... 123/422, 339

[56] References Cited

U.S. PATENT DOCUMENTS

| | | | |
|---|---|---|---|
| 5,058,550 | 10/1991 | Nagano et al. | 123/422 |
| 5,069,184 | 12/1991 | Kato et al. | 123/422 |
| 5,345,908 | 9/1994 | Nishimura et al. | 123/339 |
| 5,445,127 | 8/1995 | Cullen et al. | 123/422 |

FOREIGN PATENT DOCUMENTS

| | | |
|---|---|---|
| 58-51409 | 11/1983 | Japan . |
| 59-13333 | 4/1984 | Japan . |
| 63-239350 | 10/1988 | Japan . |

*Primary Examiner*—Raymond A. Nelli
*Attorney, Agent, or Firm*—Ronald P. Kananen

[57] ABSTRACT

An intake apparatus of an internal combustion engine for a vehicle comprises a duct for taking into a wind during a running of a vehicle, an air cleaner operatively connected to the duct, a fuel supply device for injecting a fuel into an intake air coming from the air cleaner, a movable valve arranged between an outlet port of the duct and an inlet port of the air cleaner, a negative-pressure motor for driving the movable valve, and an electronic control unit for controlling the movable valve. The electronic control unit is connected to an ignition means, and the electronic control unit controls the opening and closing of the movable valve in accordance with a rotational speed of an internal combustion engine, an opening degree of a throttle of the engine and a gear position of the engine as control parameters and carries out a delay angular control of an ignition timing in response to the opening and closing control of the movable valve.

6 Claims, 6 Drawing Sheets

INTAKE APPARATUS OF INTERNAL COMBUSTION ENGINE

BACKGROUND OF THE INVENTION

The present invention relates to an intake apparatus of an internal combustion engine for a vehicle such as motorcycle and, more particularly, to an intake apparatus having an opening and closing portion of the butterfly type structure arranged at a suction port of an air cleaner.

Conventionally, in an air cleaner arranged on the intake side of an internal combustion engine, there has been known a technology for controlling the opening and closing of a suction port of the air cleaner so as to change an air intake condition of the internal combustion engine.

First, such a technology is disclosed in the Japanese Utility Model Publication No. SHO 59-13333. In the technology of this publication, a movable member for opening and closing the suction port is actuated by means of a negative-pressure motor in accordance with an engine rotational speed to attain the improving of fuel consumption and the increasing of an output power of the internal combustion engine.

Further, in the above-mentioned technology, there have been also known a diaphragm type, a rod type and a valve type ones adapted to open and close an intake passage, which are disclosed in the Japanese Utility Model Publication No. SHO 58-51409. That is, in the technology of this publication, a diaphragm is moved in accordance with a change of a negative pressure on the downstream side of an engine throttle valve and a valve is opened and closed by means of a negative pressure motor through a rod in accordance with that movement to reduce a suction noise.

Furthermore, the above-mentioned technology is also disclosed in the Japanese Patent Laid-open Publication No. SHO 63-239350, in which a shutter is arranged at an opening portion of an air cleaner and the opening and closing of the shutter are controlled by an electronic control unit (ECU) depending on factors representing a running condition of an internal combustion engine so as to adequately control a fuel-air ratio.

In such prior arts, however, although an area of the suction port of the air cleaner is variable in accordance with the rotational speed of the engine, a variation of an output power of the internal combustion engine is large because the area of the suction port is controlled suddenly by the ON/OFF operations of the negative-pressure motor (i.e. diaphragm) due to the characteristics thereof.

Especially, when the suction port is changed over from a small opening area to a large opening area, an increase of the output power is so large that a riding feeling happens to be affected badly.

In the case of the ECU controlling like in the last mentioned prior art, since only the rotational speed of the engine is used as the control parameter and other informations are not employed, it is impossible to carry out fine control.

SUMMARY OF THE INVENTION

An object of the present invention is to substantially eliminate defects or drawbacks encountered in the prior art and to provide an intake apparatus of an internal combustion engine which is capable of controlling combustion of the internal combustion engine finely in a good response and improving a riding feeling at the time of valve changeover operation.

This and other objects can be achieved according to the present invention by providing an intake apparatus of an internal combustion engine for a vehicle comprising:

a duct for taking into a wind during a running of a vehicle;

an air cleaner operatively connected to the duct;

a fuel supply device for injecting a fuel into an intake air coming from the air cleaner;

a movable valve arranged between an outlet port of the duct and an inlet port of the air cleaner;

a negative-pressure motor for driving the movable valve; and an electronic control unit for controlling the movable valve, the electronic control unit being connected to an ignition means, wherein the electronic control unit controls the opening and closing of the movable valve in accordance with a rotational speed of an internal combustion engine, an opening degree of a throttle of the engine and a gear position of the engine as control parameters and carries out a delay angular control of an ignition timing in response to the opening and closing control of the movable valve.

In a preferred embodiments, the movable valve is supported in a chamber formed to a lower surface portion of the air cleaner. The negative-pressure motor comprises a diaphragm which is mounted to a bottom portion of the chamber. The chamber is formed from a case body and the air cleaner has a case body to which the case body of the chamber is integrated so that the negative-pressure motor and the movable valve are integrated with the case body of the air cleaner.

The internal combustion engine is provided with a rotational speed sensor, a throttle sensor and a gear position sensor, and the electronic control unit is inputted with the rotational speed of an internal combustion engine from the rotational speed sensor, the opening degree of a throttle from the throttle sensor and the gear position from the gear position sensor. The electronic control unit may be a central processing unit.

According to the characters and structures of the present invention described above, the electronic control unit controls the opening and closing of the movable valve in accordance with the rotational speed of the engine, the opening degree of the throttle and the gear position thereof as control parameters. Therefore, since in addition to the rotational speed of the engine, also the opening degree of the throttle and the gear position are employed as the control parameters, the movable valve can be controlled in response to not only the rotational speed of the engine but also the opening degree of the throttle and the gear position, so that the fine control can be accomplished.

Further, since the delay angular controlling for the ignition timing is carried out in accordance with the opening and closing control of the movable valve, it becomes possible to restrain a sudden change of the output power of the internal combustion engine which tends to be caused at the time of operation of the movable valve, so that the riding feeling of a rider on a motorcycle, for example, can be improved at the time of the valve changeover operation.

Furthermore, since the negative-pressure motor and the movable valve are integrated with the case body of the air cleaner, brackets of the negative-pressure motor and the movable valve to be mounted to a frame of a motorcycle become unnecessary, and the number of component parts can be decreased. When the air cleaner is removed from a motorcycle body, it becomes easy to handle the negative-pressure motor and the movable valve, thus improving the maintenance performances thereof.

The nature and further features of the present invention will be made further clear from the following descriptions made with reference to the accompanying drawings.

DESCRIPTION OF THE PREFERRED EMBODIMENT

An embodiment of the present invention will be described hereunder with reference to the accompanying drawings.

FIGS. 1 to 5 are explanatory views of an intake apparatus of an internal combustion engine according to an embodiment of the present invention, which is applied to a motorcycle.

Figure 1:
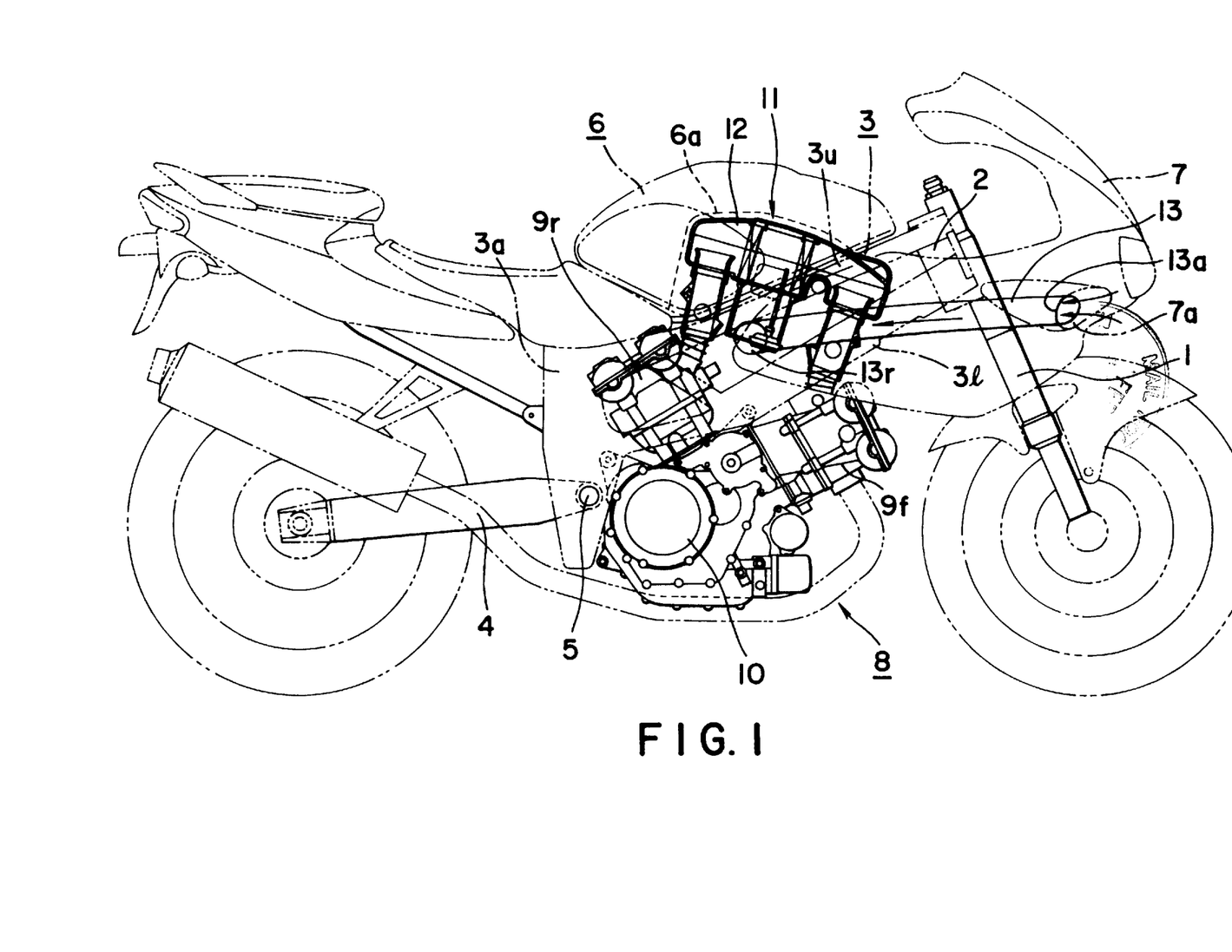
FIG. 1 is an explanatory view of an intake apparatus of an internal combustion engine mounted to a motorcycle according to an embodiment of the present invention.

Referring to FIG. 1, a motorcycle has a pair of left and right as well as upper and lower separate main tubes 3 extending backward from a steering head pipe 2 which supports a front fork 1 rotatably, and the main tubes 3 have pivot portions 3a formed at their rear end portions which pivotally support rear swing arms 4 by means of pivot shafts 5.

A fuel tank 6 having a concave portion 6a formed in its lower surface is placed and fixedly secured onto upper ones 3u of the main tubes 3. A fairing 7 for shielding and straightening a travel wind is attached to a front portion of the motorcycle body so as to cover an extent from an upper portion above the front fork 1 and a surrounding of the steering head pipe 2 to mid portions of the main tubes 3.

An internal combustion engine 8 of the motorcycle is of the V-type structure and is mounted to nearly an intermediate portion of the motorcycle body in a vertical posture (the V shape faces along the fore and rear direction), and the internal combustion engine 8 has an upper portion of its rear cylinder 9r held between the pair of left and right main tubes 3, 3 and an upper end portion of its engine case 10 fixedly secured to lower ones 31 of the main tubes 3 by tightening.

Figure 2:
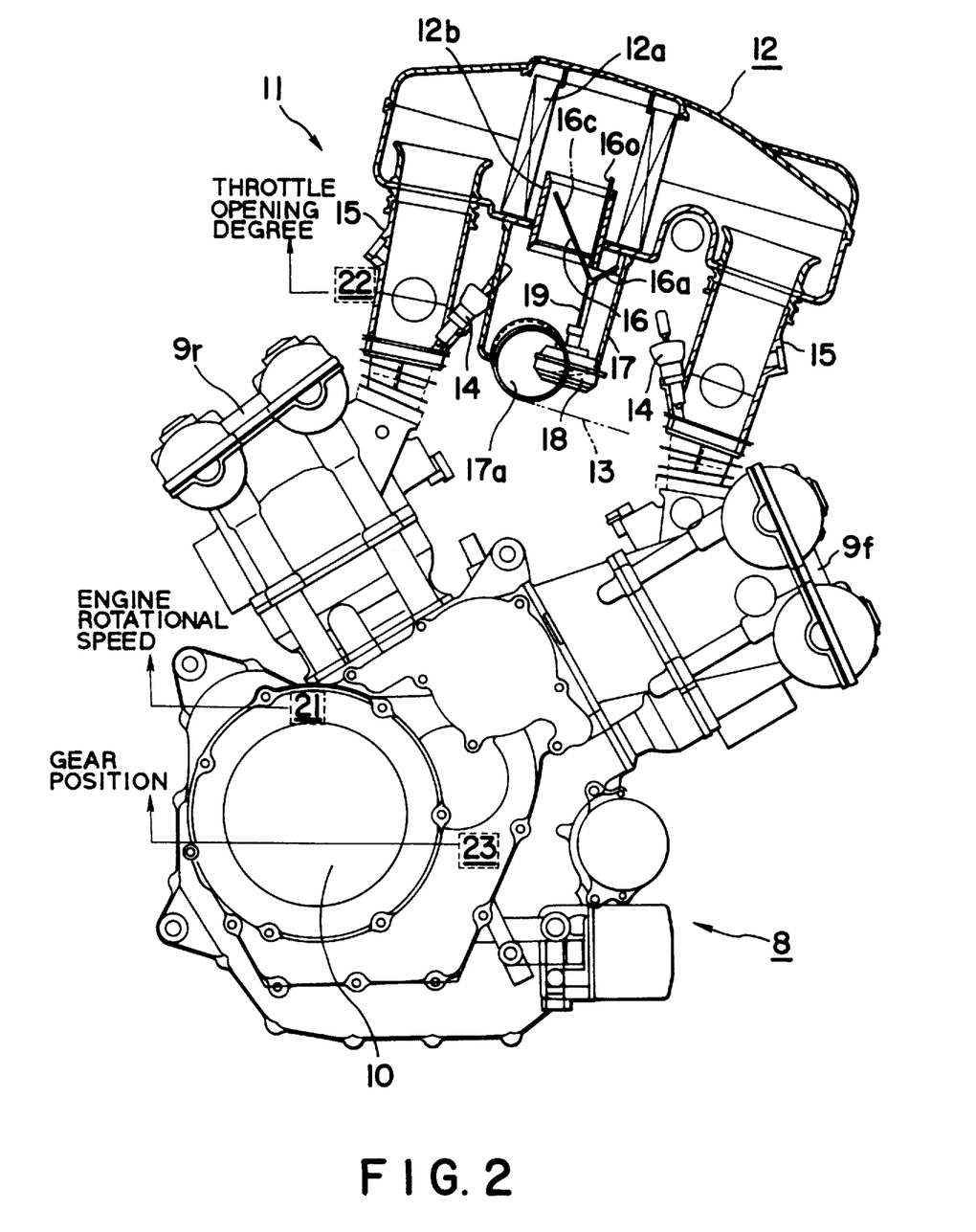
FIG. 2 is a view, in an enlarged scale, of a structure surrounding the intake apparatus of FIG. 1.

As shown in FIG. 2, the internal combustion engine 8 has an intake apparatus comprising a fuel supply device 11, an air cleaner 12 and ducts 13. The fuel supply device 11 has throttle bores 15, to which fuel injection nozzles 14 to be electronically controlled are attached, connected to the suction sides of the fore and the rear cylinders 9f, 9r respectively. The suction side of the throttle bores 15 is connected to the clean side of the air cleaner 12.

The air cleaner 12 generally exhibits such an outer appearance of an inverted bowl shape with its lower portion closed and is received by the concave portion 6a of the lower surface of the fuel tank 6. A cylindrical air filter 12a is attached to the intermediate portion of the air cleaner 12, and the inside of the air filter 12a is a dirty side and the outside thereof is a clean side. The suction side of the throttle bore 15 is connected to the clean side of the air cleaner 12 as mentioned above, and the suction port on the dirty side has a cylindrical suction port portion 12b projecting downward. A movable valve 16 is pivotally supported by a shaft 16a at a portion adjacent to the lower end portion of this suction port portion.

A chamber 17 covering the suction port portion 12b is formed in the lower surface portion of the air cleaner 12 so as to project downward. A negative-pressure motor 18 provided with a diaphragm is arranged at a bottom portion of the chamber 17.

Therefore, a case body which forms the chamber 17 is fixedly secured to a case body of the air cleaner 12, so that the negative-pressure motor 18 and the movable valve 16 are integrated with each other when the case body of the chamber 17 is fixedly secured to the case body of the air cleaner 12.

A pair of left and right openings 7a are formed in the front face of the fairing 7 at the front portion of the motorcycle body, and the front portion of the duct 13 is connected to this opening 7a and is opened. The rear end portions 13r of the ducts 13 is connected to the openings 17a at the opposed sides of the lower portion of the chamber 17 so as to induct the travel wind to the air cleaner 12 through the ducts 13. Accordingly, the travel wind inducted from the openings 7a of the fairing 7 at the front face of the motorcycle body is inducted to the air cleaner 12, i.e. the dirty side, through the ducts 13 and the chamber 17.

In the fuel supply device 11, a gaseous mixture is produced by injecting a fuel from the injection nozzle 14 into a suction air flowing through the throttle bore 15 so that the fuel can be supplied to the internal combustion engine 8 in the form of the gaseous mixture.

The movable valve 16 is pivotally supported within the chamber 17 between the rear end portions 13r having the outlet ports of the ducts 13 and the dirty side having the inlet port of the air cleaner 12. The movable valve 16 is linked to the negative-pressure motor 18 having the diaphragm by a rod 19, so that the movable valve 16 can open and close the inlet port of the air cleaner 12 by the inputting of the control negative pressure to the negative-pressure motor 18.

In the negative-pressure motor 18, the rod 19 is connected to the diaphragm of the negative-pressure motor 18 and projected upward, and the movable valve 16 is connected to the upper end portion of the rod 19. That is, a return spring is accommodated within the negative-pressure motor 18, so that the diaphragm is made convex by this return spring when the atmospheric pressure prevails and the rod 19 takes a projecting position (an upward moved position in FIG. 2) while the movable valve 16 takes an open position (indicated by the symbol 16o) through the rod 19. On one hand, when the negative pressure is supplied, the diaphragm becomes concave and the rod 19 takes a drawn position (a downward moved position in FIG. 2) while the movable valve 16 becomes a closed position (indicated by the symbol 16c) through the rod 19.

Figure 3:
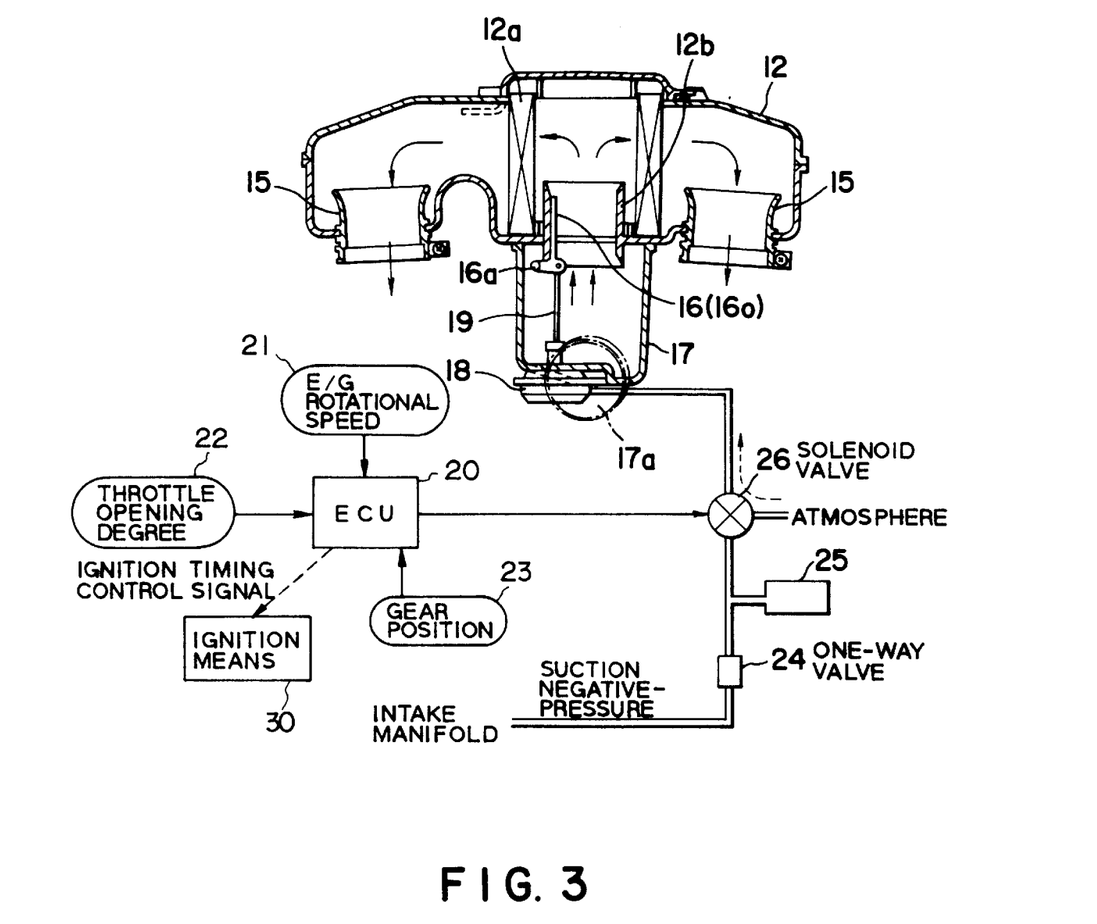
FIG. 3 is a schematic view of a control system for explaining an operation of a movable valve in an opened state.
Figure 4:
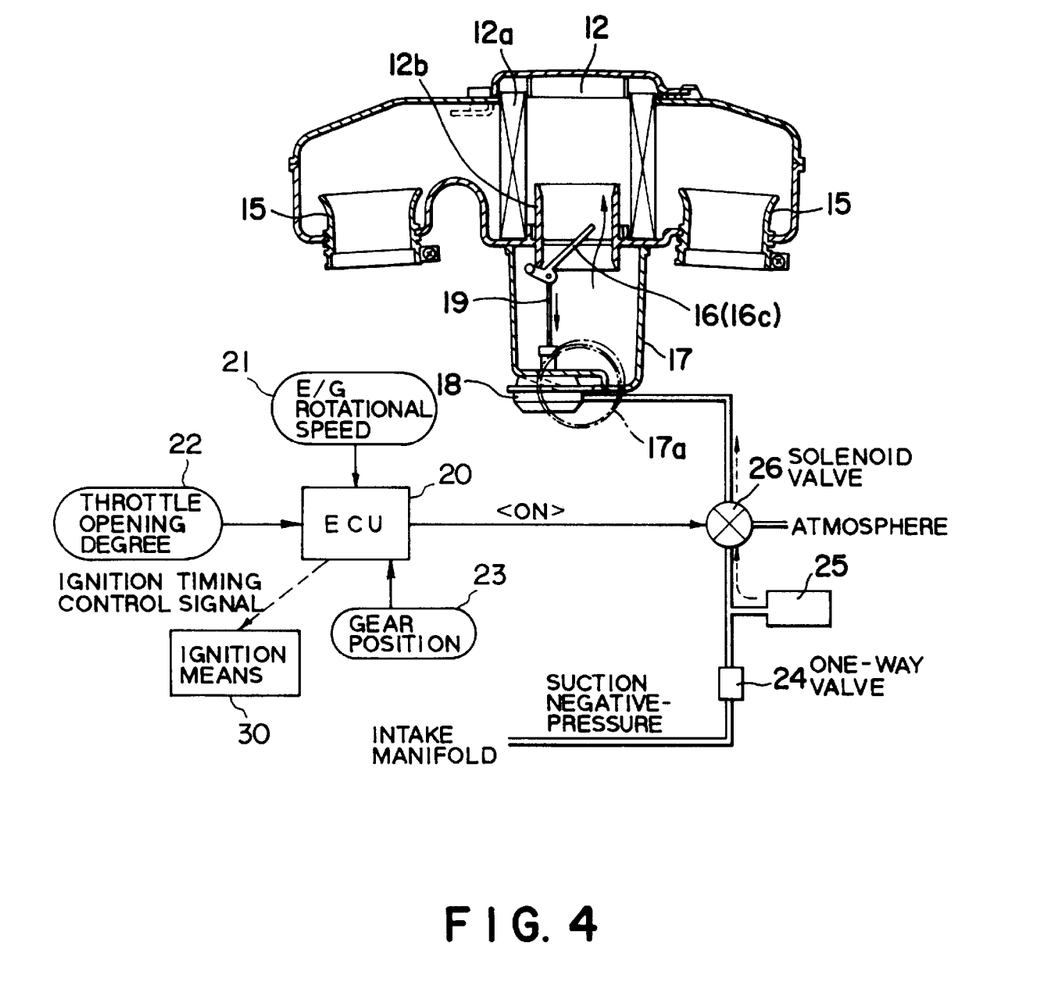
FIG. 4 is a schematic view of a control system for explaining an operation of a movable valve in a closed state.

FIGS. 3 and 4 are explanatory views of a control system of the movable valve 16. Incidentally, FIG. 3 shows the open position (16o) of the movable valve 16 and FIG. 4 shows the closed position (16c) thereof.

As shown in FIGS. 3 and 4, the motorcycle is equipped with an electronic control unit (ECU) 20 comprising a microcomputer (i.e. a central processing unit (CPU)) for controlling the opening and closing of the movable valve 16. A rotational speed of the engine (an engine rotational speed) outputted from a rotational speed sensor 21 of the internal combustion engine 8, a throttle opening degree outputted from a throttle sensor 22 and a gear position outputted from a gear position sensor 23 are inputted to the electronic control unit 20.

Incidentally, a position to which each of the sensors is attached is exemplified as one example in FIG. 2, but not limited to this example. Further, since it is enough to detect an equivalent one as a parameter by computing and so on, a detecting means is not limited to a particular one.

The electronic control unit 20 controls the opening and closing of the movable valve 16 in accordance with a control program and a control map stored in an internal or an external memory (ROM and so on) by employing the inputted rotational speed of the engine, throttle opening degree and gear position as the control parameter.

An ignition timing control signal is outputted from the electronic control unit 20 to an ignition device 30, and the electronic control unit 20 carries out a delay angular controlling of the ignition timing in accordance with the opening and closing control of the movable valve 16.

A mechanism for driving the movable valve 16 by the control signal outputting from the electronic control unit 20 is as follows.

That is, an intake negative pressure is taken out of an intake manifold on the downstream side of the throttle valve in the throttle bore 15, the negative pressure is stored within a negative-pressure chamber 25 through a one-way valve 24, and a solenoid valve 26 is arranged between the negative-pressure chamber 25 and the negative-pressure motor 18. The negative-pressure chamber 25 stores the negative pressure so that an actuation force capable of actuating the movable valve 16 sufficiently can be obtained from the negative-pressure motor 18. The solenoid valve 26 supplies the negative pressure to the negative-pressure motor 18 by inputting of an ON signal and, on one hand, inducts the atmospheric pressure into the negative-pressure motor 18 by an OFF signal (i.e. condition in which the ON signal is not inputted).

The ON/OFF signal is inputted from the electronic control unit 20 to the solenoid valve 26 to actuate or not to actuate the negative-pressure motor 18 and then to control the movable valve 16 into the closed and opened positions (the positions shown in FIG. 4 and FIG. 3). Incidentally, the movable valve 16 has a small opening area set so as to flow a certain amount of intake air into the air cleaner 12 even in the closed position.

Then, an operation of the movable valve 16 will be described hereunder. Initially, as shown in FIG. 3, the movable valve 16 is set to the opened position (16*o*).

The electronic control unit 20 outputs the ON signal to the solenoid valve 26 under a certain condition in response to the engine rotational speed, the throttle opening degree and the gear position detected by the respective sensors 21, 22 and 23. Thereupon, as shown in FIG. 4, the solenoid valve 26 is opened, and the negative pressure stored within the negative-pressure chamber 25 is supplied to the negative-pressure motor 18 to move the rod 19 downward. Thus, the movable valve 16 connected to the leading end portion of the rod 19 rotates about the shaft 16*a* to reduce the suction port area and to take the closed position (16*c*) of FIG. 4.

Further, when the above-mentioned certain condition comes to be broken, the ON signal is not outputted from the electronic control unit 20 and, as shown in FIG. 3, the solenoid valve 26 is closed as well as the pressure within the negative-pressure motor 18 becomes equal to the atmospheric pressure, so that the movable valve 16 is returned to its original position (16*o*) of FIG. 3 by means of the return spring within the negative-pressure motor 18 through the rod 19.

Figure 5:
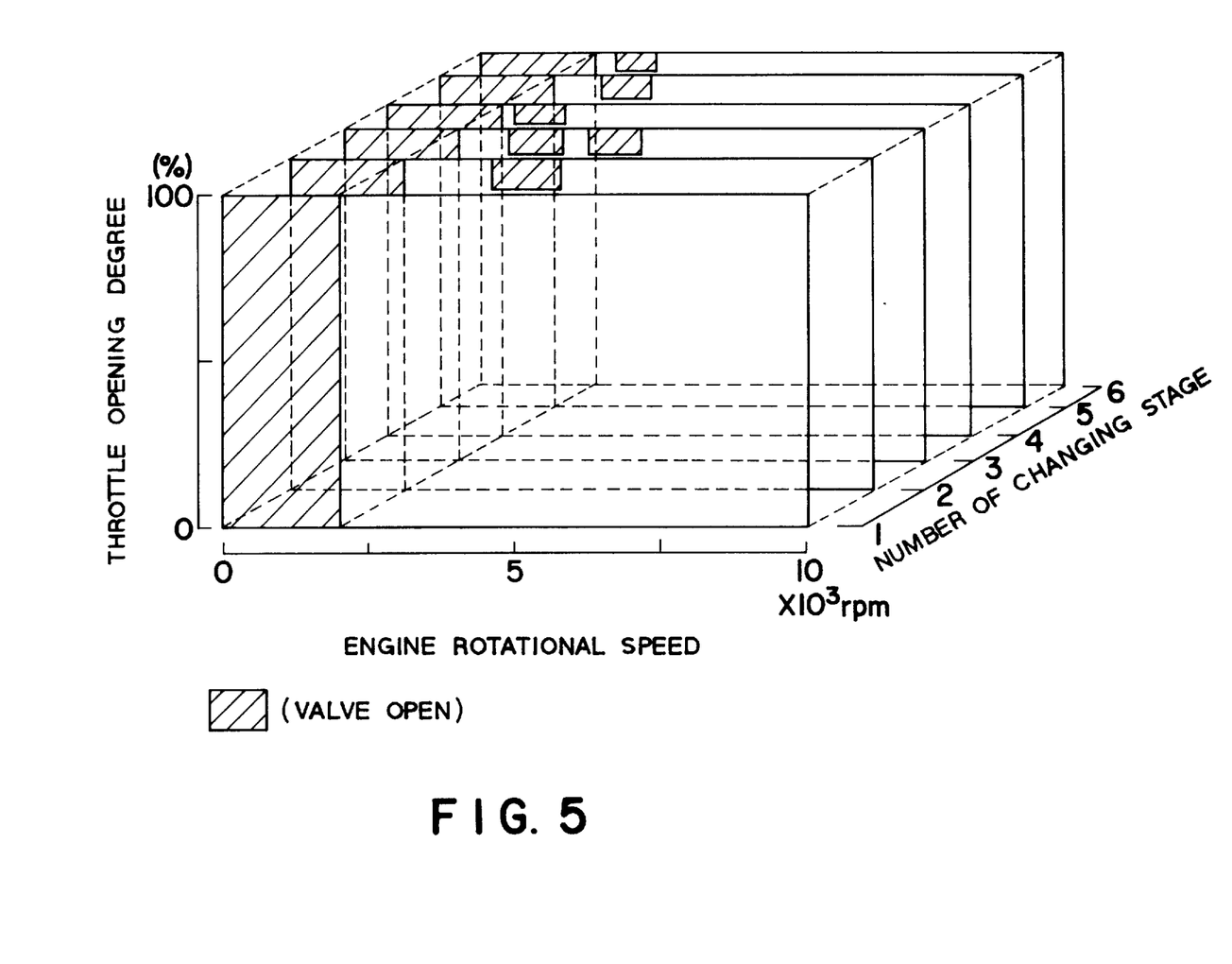
FIG. 5 is a diagram showing an example of a control map for the opening and closing control of the movable valve.
Figure 6:
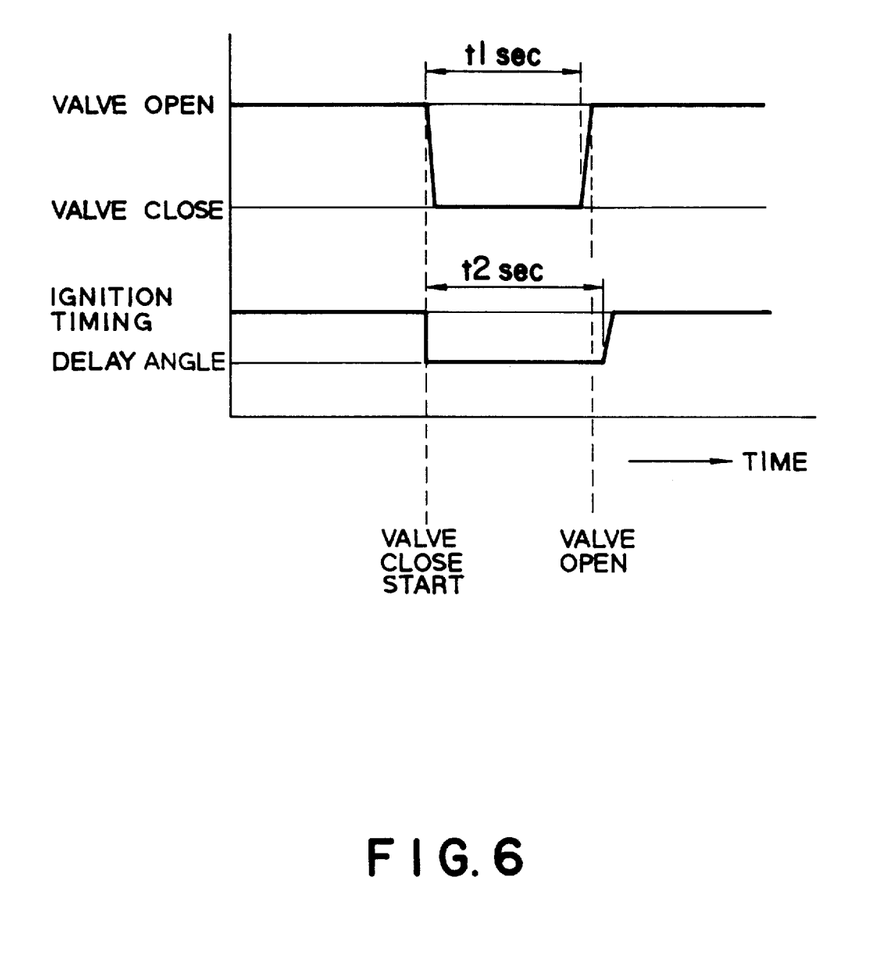
FIG. 6 is a diagram showing an example of the controlling of ignition timing in accordance with the opening and closing control of the movable valve.

FIGS. 5 and 6 show one example of the control characteristic of the movable valve 16 according to the present invention.

FIG. 5 shows an example of a control map (control characteristic diagram) of the opening and closing control of the movable valve 16, in which the movable valve 16 is closed in the regions hatched in FIG. 5.

In this case, the internal combustion engine has a transmission gear with six stages (the number of speed changes being 6) in which the closing signal for the movable valve 16 is outputted even in any speed-change stage and even in any throttle opening degree in a predetermined low speed range. Further, in the middle rotational speed range, the movable valve 16 is closed when the throttle opening degree gets near 100% within the range of the second stage to the sixth stage.

FIG. 6 shows a control example of the ignition timing in accordance with operations of the movable valve 16.

The movable valve 16 performs the opening and closing operation in accordance with the map of FIG. 5 and performs the delay angular control also for the ignition timing simultaneously with the changeover of the valve from its opened position to its closed position as shown in FIG. 6 and actuates a timer simultaneously.

On one hand, when the movable valve 16 is changed over from the closed position to the opened position, the ignition timing is returned to its ordinary one by a little time lag. That is, when a time passing from the closing of the movable valve 16 to the reopening thereof is defined to t1 (sec.) and a time passing from the delay angular position of the ignition timing to the returning again to the original timing is defined to t2 (sec.), the condition of t1<t2 is provided.

Accordingly, when the movable valve 16 is changed over from the closed position to the opened position, the opening area of the air cleaner suction port portion 12*b* is generally changed over from a small one to a large one by the ON/OFF control of the movable valve 16 so that an amount of suction air changes suddenly. Although the output power of the internal combustion engine changes suddenly if the sudden change of the suction air is left as it is to badly affect the riding feeling, since the ignition timing is kept at a delayed angle for a while just after the change of the valve 16 in this embodiment, such sudden change of the output power can be prevented so as to prevent the bad affection to the riding feeling reliably.

As noted above, according to the embodiment, since the throttle opening degree and the gear position are further used as the control parameter besides the engine rotational speed, the movable valve 16 is controlled based on not only the engine rotational speed but also the throttle opening degree and the gear position to realize the fine control. By optimizing the suction port area by means of the movable valve 16, the combustion can be improved within that range, and the riding feeling can be improved by the improvement of the combustion. Further, since the delay angular control for the ignition timing is carried out in accordance with the opening and closing control of the movable valve 16, the sudden change of the output power of the internal combustion engine 8 caused by the operation of the movable valve 16 is restrained so that the riding feeling at the time of changeover of the movable valve 16 can be improved accordingly.

According to the characters and structures of the present invention described above, the electronic control unit controls the opening and closing of the movable valve in accordance with the rotational speed of the engine, the opening degree of the throttle and the gear position thereof as control parameters. Therefore, since in addition to the rotational speed of the engine, also the opening degree of the throttle and the gear position are employed as the control parameters, the movable valve can be controlled in response to not only the rotational speed of the engine but also the opening degree of the throttle and the gear position, so that the fine control can be accomplished.

What is claimed is:

1. An intake apparatus of an internal combustion engine for a vehicle comprising:

a duct for taking into a wind during a running of a vehicle;

an air cleaner operatively connected to the duct;

a fuel supply device for injecting a fuel into an intake air coming from the air cleaner;

a movable valve arranged between an outlet port of the duct and an inlet port of the air cleaner;

a negative-pressure motor for driving the movable valve; and an electronic control unit for controlling the movable valve, said electronic control unit being connected to an ignition means, wherein said electronic control unit controls the opening and closing of the movable valve in accordance with a rotational speed of an internal combustion engine, an opening degree of a throttle of the engine and a gear position of the engine as control parameters and carries out a delay angular control of an ignition timing in response to the opening and closing control of the movable valve.

2. An intake apparatus according to claim 1, wherein said movable valve is supported in a chamber formed to a lower surface portion of the air cleaner.

3. An intake apparatus according to claim 2, wherein said negative-pressure motor comprises a diaphragm which is mounted to a bottom portion of the chamber.

4. An intake apparatus according to claim 3, wherein said chamber is formed from a case body and said air cleaner has a case body to which the case body of the chamber is integrated so that said negative-pressure motor and said movable valve are integrated with the case body of the air cleaner.

5. An intake apparatus according to claim 1, wherein the internal combustion engine is provided with a rotational speed sensor, a throttle sensor and a gear position sensor and wherein said electronic control unit is inputted with the rotational speed of an internal combustion engine from the rotational speed sensor, the opening degree of a throttle from the throttle sensor and the gear position from the gear position sensor.

6. An intake apparatus according to claim 5, wherein said electronic control unit is a central processing unit.

* * * * *